(12) United States Patent
Peck

(10) Patent No.: US 11,655,891 B2
(45) Date of Patent: May 23, 2023

(54) METHOD OF MACHINING AN AXLE CARRIER HOUSING

(71) Applicant: Mahindra N.A. Tech Center, Auburn Hills, MI (US)

(72) Inventor: David E. Peck, Rochester Hills, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 345 days.

(21) Appl. No.: 17/015,294

(22) Filed: Sep. 9, 2020

(65) Prior Publication Data

US 2022/0074478 A1    Mar. 10, 2022

(51) Int. Cl.
*F16H 57/037*    (2012.01)
*B23P 15/00*    (2006.01)
(Continued)

(52) U.S. Cl.
CPC ............ *F16H 57/037* (2013.01); *B23P 15/00* (2013.01); *B60B 35/16* (2013.01);
(Continued)

(58) Field of Classification Search
CPC ..... B23B 5/04; F16H 48/08; F16H 2048/382; F16H 2057/0043; F16H 2057/0062; B23Q 3/183

See application file for complete search history.

(56) References Cited

U.S. PATENT DOCUMENTS 2,124,406 A * 7/1938 Spatta ................... B60B 35/004
                                                  301/124.1
2,204,287 A   6/1940 Wilber
(Continued)

FOREIGN PATENT DOCUMENTS

DE      20221813 U1    2/2008
EP       1884303 B1 *  2/2012   ....... B23B 31/16191
(Continued)

OTHER PUBLICATIONS

EP-1884303-B1 Machine Translation (Year: 2012).*
(Continued)

*Primary Examiner* — Michael W Hotchkiss
(74) *Attorney, Agent, or Firm* — Harness, Dickey & Pierce, P.L.C.

(57) ABSTRACT

A method of machining a carrier housing for an axle assembly comprises obtaining a carrier housing including circumferentially spaced apart tabs and positioning a datum setting tool in engagement with the carrier housing. The carrier housing is clamped to a fixture to position the carrier housing at a first orientation relative to a coordinate system within a work cell. The datum setting tool is disengaged from the carrier housing. Portions of the carrier housing along a first side are machined to define features including a carrier mounting flange and a cylindrical bearing bore extending perpendicular to the carrier mounting flange while the carrier housing remains clamped at the first orientation. Different portions of the carrier housing, on a second opposite side of the carrier housing, are machined to define additional geometrical feature while the initial clamped orientation continues to be maintained.

15 Claims, 13 Drawing Sheets

(51) Int. Cl.
*B60B 35/16* (2006.01)
*F16H 57/02* (2012.01)
*F16H 48/42* (2012.01)

(52) U.S. Cl.
CPC .. *B60B 2310/302* (2013.01); *F16H 2048/423* (2013.01); *F16H 2057/02017* (2013.01); *F16H 2057/02052* (2013.01)

(56) References Cited

U.S. PATENT DOCUMENTS

| | | | |
|---|---|---|---|
| 2,478,180 | A | 8/1949 | Buckendale |
| 2,674,783 | A | 4/1954 | Schneider et al. |
| 2,961,888 | A | 11/1960 | Wildhaber |
| 3,198,036 | A * | 8/1965 | Muller ............... F16H 48/06 |
| | | | 74/607 |
| 3,706,350 | A | 12/1972 | Bokovoy |
| 3,838,751 | A | 10/1974 | Brown |
| 4,610,185 | A | 9/1986 | France |
| 4,660,401 | A | 4/1987 | Kohama et al. |
| 4,921,036 | A | 5/1990 | Kuwahara |
| 5,267,489 | A | 12/1993 | Ziech |
| 5,271,294 | A * | 12/1993 | Osenbaugh ........... B60K 17/16 |
| | | | 74/606 R |
| 5,400,506 | A * | 3/1995 | Ichiki ............... F16H 48/08 |
| | | | 29/893.1 |
| 5,411,699 | A | 5/1995 | Collette et al. |
| 5,487,539 | A * | 1/1996 | Obrist ................ B25B 5/087 |
| | | | 269/309 |
| 5,492,419 | A | 2/1996 | Miller et al. |
| 5,634,374 | A | 6/1997 | Depietri |
| 5,775,975 | A | 7/1998 | Mizuno et al. |
| 5,840,350 | A | 11/1998 | Salemi |
| 5,884,980 | A | 3/1999 | Visser et al. |
| 6,058,605 | A | 5/2000 | Binder et al. |
| 6,093,127 | A | 7/2000 | DiDomenico et al. |
| 6,349,781 | B1 | 2/2002 | Kruse |
| 6,364,803 | B1 | 4/2002 | Barnholt et al. |
| 6,484,391 | B1 * | 11/2002 | Dillon ............... B25B 27/06 |
| | | | 29/898.07 |
| 6,514,169 | B2 | 2/2003 | Turner et al. |
| 6,561,788 | B1 | 5/2003 | Gaudoin |
| 6,609,649 | B1 | 8/2003 | Barnholt et al. |
| 6,623,867 | B2 | 9/2003 | Crocco et al. |
| 6,729,206 | B2 | 5/2004 | Hayabuchi et al. |
| 6,863,634 | B2 | 3/2005 | Holman et al. |
| 6,896,270 | B1 | 5/2005 | Sturman et al. |
| 6,948,924 | B2 | 9/2005 | Tsau et al. |
| 6,979,131 | B1 | 12/2005 | Lippert et al. |
| 7,004,277 | B2 * | 2/2006 | Pollock ............... F16H 57/037 |
| | | | 411/88 |
| 7,137,183 | B2 | 11/2006 | Stuart et al. |
| 7,210,374 | B2 | 5/2007 | Leimann |
| 7,231,847 | B2 * | 6/2007 | Hibbler ............... F16H 57/037 |
| | | | 74/606 R |
| 7,258,644 | B2 | 8/2007 | Ziech et al. |
| 7,287,911 | B2 | 10/2007 | Dodoro et al. |
| 7,306,536 | B2 | 12/2007 | Ziech |
| 7,377,598 | B2 * | 5/2008 | Doud ................ B60B 35/003 |
| | | | 180/378 |
| 7,503,240 | B2 | 3/2009 | Hibbler et al. |
| 7,537,390 | B2 | 5/2009 | De Boer et al. |
| 7,585,032 | B2 | 9/2009 | Seeds et al. |
| 7,658,128 | B2 | 2/2010 | Sugano |
| 7,866,231 | B2 * | 1/2011 | Kincaid ............... F16H 57/037 |
| | | | 74/607 |
| 7,984,552 | B2 | 7/2011 | Doud et al. |
| 8,166,848 | B2 * | 5/2012 | Uozumi ............... F16H 57/025 |
| | | | 74/606 R |
| 8,176,811 | B2 * | 5/2012 | Peterson ............... F16H 57/037 |
| | | | 74/606 R |
| 8,186,884 | B2 | 5/2012 | Henneberger |
| 8,464,611 | B1 | 6/2013 | Chandler |
| 8,469,462 | B2 | 6/2013 | Doud et al. |
| 8,573,087 | B2 | 11/2013 | Stadtfeld |
| 8,591,116 | B2 | 11/2013 | Fedorovich |
| 8,776,374 | B2 * | 7/2014 | Johnston ............... B60B 35/16 |
| | | | 29/33 B |
| 8,881,401 | B2 | 11/2014 | Aoyama et al. |
| 8,911,312 | B2 * | 12/2014 | Itoo ................ F16H 57/0489 |
| | | | 474/93 |
| 8,951,034 | B2 | 2/2015 | Christiansen et al. |
| 9,022,893 | B2 | 5/2015 | Hirao et al. |
| 9,109,689 | B2 * | 8/2015 | Khatavkar ........... F16H 57/037 |
| 9,151,329 | B2 | 10/2015 | Katsaros |
| 9,221,219 | B2 | 12/2015 | Frederiksen |
| 9,517,658 | B2 | 12/2016 | Chung et al. |
| 9,669,710 | B2 | 6/2017 | Meixner |
| 9,746,069 | B2 | 8/2017 | Gerstenberger et al. |
| 9,810,309 | B2 | 11/2017 | Chen et al. |
| 9,884,359 | B2 | 2/2018 | Peters et al. |
| 10,179,478 | B2 | 1/2019 | Bauer et al. |
| 10,279,625 | B2 * | 5/2019 | Kelly ................ F16H 57/032 |
| 10,352,431 | B2 | 7/2019 | Nakagawa et al. |
| 10,527,146 | B2 * | 1/2020 | Deir .................. F16H 48/08 |
| 10,571,889 | B2 * | 2/2020 | Ghanem ............... G01B 11/14 |
| 11,319,009 | B2 * | 5/2022 | Derr .................. B62D 65/022 |
| 2003/0070501 | A1 | 4/2003 | Sell |
| 2005/0238273 | A1 | 10/2005 | Kawamura et al. |
| 2007/0221337 | A1 * | 9/2007 | Sammartin ........... B23Q 3/183 |
| | | | 157/14 |
| 2007/0292223 | A1 * | 12/2007 | Byrnes ................ B23H 1/04 |
| | | | 408/91 |
| 2010/0011919 | A1 * | 1/2010 | Creemers ............ B23B 5/04 |
| | | | 82/112 |
| 2012/0021863 | A1 | 1/2012 | Hirao et al. |
| 2014/0041481 | A1 * | 2/2014 | Pinotti ............... B21D 53/90 |
| | | | 228/164 |
| 2015/0020626 | A1 | 1/2015 | Aoyama et al. |
| 2015/0087461 | A1 | 3/2015 | Jackson et al. |
| 2015/0211604 | A1 | 7/2015 | Hirao et al. |
| 2018/0215200 | A1 * | 8/2018 | Trost .................. B60K 17/36 |
| 2018/0259038 | A1 | 9/2018 | Aoyama et al. |
| 2019/0024772 | A1 | 1/2019 | Ketchel et al. |
| 2019/0293168 | A1 | 9/2019 | Abe et al. |

FOREIGN PATENT DOCUMENTS

| | | | | |
|---|---|---|---|---|
| JP | | 10009258 A | 1/1998 | |
| JP | | H 109259 A | 1/1998 | |
| KR | | 101058952 B1 * | 8/2011 | ............ B23P 19/00 |
| KR | | 20140069451 A | 6/2014 | |
| KR | | 101440994 B1 * | 9/2014 | ............ B23K 37/04 |
| KR | | 10-1982224 B1 | 5/2019 | |
| WO | | WO-9626844 A1 | 9/1996 | |
| WO | | WO-2017/216404 A1 | 12/2017 | |

OTHER PUBLICATIONS

KR-101058952-B1 Machine Translation (Year: 2011).*
KR101440994B1 Machine Translated Description (Year: 2014).*
U.S. Appl. No. 17/015,272, filed Sep. 9, 2020, David Peck.
U.S. Appl. No. 17/015,430, filed Sep. 9, 2020, David Peck.
U.S. Appl. No. 17/015,472, filed Sep. 9, 2020, David Peck.
U.S. Appl. No. 17/015,543, filed Sep. 9, 2020, David Peck.

* cited by examiner

METHOD OF MACHINING AN AXLE CARRIER HOUSING

FIELD

The subject disclosure is generally directed to axle assemblies for vehicles, such as front or rear drive axle assemblies used in automobiles and trucks.

BACKGROUND

This section provides background information related to the present disclosure which is not necessarily prior art.

Axle assemblies are commonly used to support and/or rotationally drive the wheels of a vehicle. For example, a vehicle may include a front axle assembly to which front wheels of the vehicle are mounted and a rear axle assembly to which rear wheels of the vehicle are mounted. Typically, the front and rear axle assemblies extend across the vehicle in a transverse direction that is perpendicular to the direction of vehicle travel. The front and rear axle assemblies support the front and rear wheels and are connected to a body and/or frame of the vehicle by front and rear suspension systems that articulate to allow the front and rear axle assemblies to move up and down relative to the body and/or frame of the vehicle.

One or more axle assemblies of the vehicle may also transfer rotational power and torque provided by an engine of the vehicle to the wheels. For example, the engine may rotationally drive a drive shaft through a transmission assembly. The axle assembly may include a pinion gear that is rotationally driven by the drive shaft in meshed engagement with a ring gear. The ring gear is fixed for rotation with a differential that transfers rotational power and torque from the pinion gear to a pair of axle shafts that extend out from the differential in opposite transverse directions. The axle shafts are connected to and drive the wheels on opposing ends of the axle assembly. A pinion input bearing mounted to a carrier may be used to support the pinion gear. The pinion gear is typically cantilever mounted and may deflect from its axis of rotation more than a desired amount during torque transfer causing misalignment between gear teeth.

In typical drive axle assembly manufacturing facilities, one or more work stations are dedicated to setting pinion input bearing preload. One well known procedure includes implementing a trial and error process including placing an initial quantity of shims between a pinion bearing mounting flange and the carrier housing. A threaded fastener is driven to clamp the pinion bearing flange to the carrier which at the same time sets the pinion bearing preload. The magnitude of the pinion bearing preload is based on the thickness of the shim pack. If the first guess at shim thickness is incorrect, the assembler disassembles the pinion shaft, pinion gear, pinon flange arrangement and repeats the process using a different shim pack thickness. This iterative process continues until the pinion bearing preload is within a predetermined range.

The dimensional tolerances involved with employing conventional machining techniques to form the various bearing seat and other geometrical features of the axle carrier housing result in employing the trial and error shimming operation previously described. Improvements in the method of machining the carrier housing may substantially reduce the overall cost and time required to manufacture a drive axle assembly. Such efforts may also afford the use of alternate bearing arrangements to support the pinion gear and define a more robust and cost efficient axle assembly.

SUMMARY

This section provides a general summary of the disclosure, and is not a comprehensive disclosure of its full scope or all of its features.

In one aspect of the present disclosure, a method of machining a carrier housing for an axle assembly comprises obtaining a carrier housing including circumferentially spaced apart tabs and positioning a datum setting tool in engagement with the carrier housing. Additional steps include clamping the carrier housing to a fixture to position the carrier housing at a first orientation relative to a coordinate system within a work cell, removing the datum setting tool from engagement with the carrier housing, machining portions of the carrier housing along a first side of the carrier housing to define geometrical features including a planar carrier mounting flange and a first cylindrical bearing bore having a longitudinal axis extending perpendicular to the planar carrier mounting flange while the carrier housing remains clamped at the first orientation, and machining a different portion of the carrier housing on a second opposite side of the carrier housing to define another geometrical feature.

In another aspect of the present disclosure, a method of machining a carrier housing for an axle assembly comprises obtaining a carrier housing including integrally formed and circumferentially spaced apart tabs and positioning a datum setting tool at a first position within a work cell. The method also includes engaging a portion of the carrier housing with the datum setting tool, aligning the carrier housing relative to the work cell, and clamping the carrier housing to a fixture within the work cell to position the carrier housing at a first orientation relative to a coordinate system. Further steps include moving the datum setting tool from the first position to a second spaced apart position to disengage datum setting tool from the carrier housing, machining portions of the carrier housing positioned on a first side of the carrier housing to define geometrical features including a planar carrier mounting flange, a first cylindrical bearing bore having a longitudinal axis, and second bearing bore having a second longitudinal axis extending perpendicular to the first longitudinal axis while the carrier housing remains clamped at the first orientation, and subsequently machining a different portion of the carrier housing on a second opposite side of the carrier housing to define another geometrical feature while the carrier housing remains clamped at the first orientation.

DRAWINGS

Other advantages of the present invention will be readily appreciated, as the same becomes better understood by reference to the following detailed description when considered in connection with the accompanying drawings wherein.

DETAILED DESCRIPTION

Figure 1:
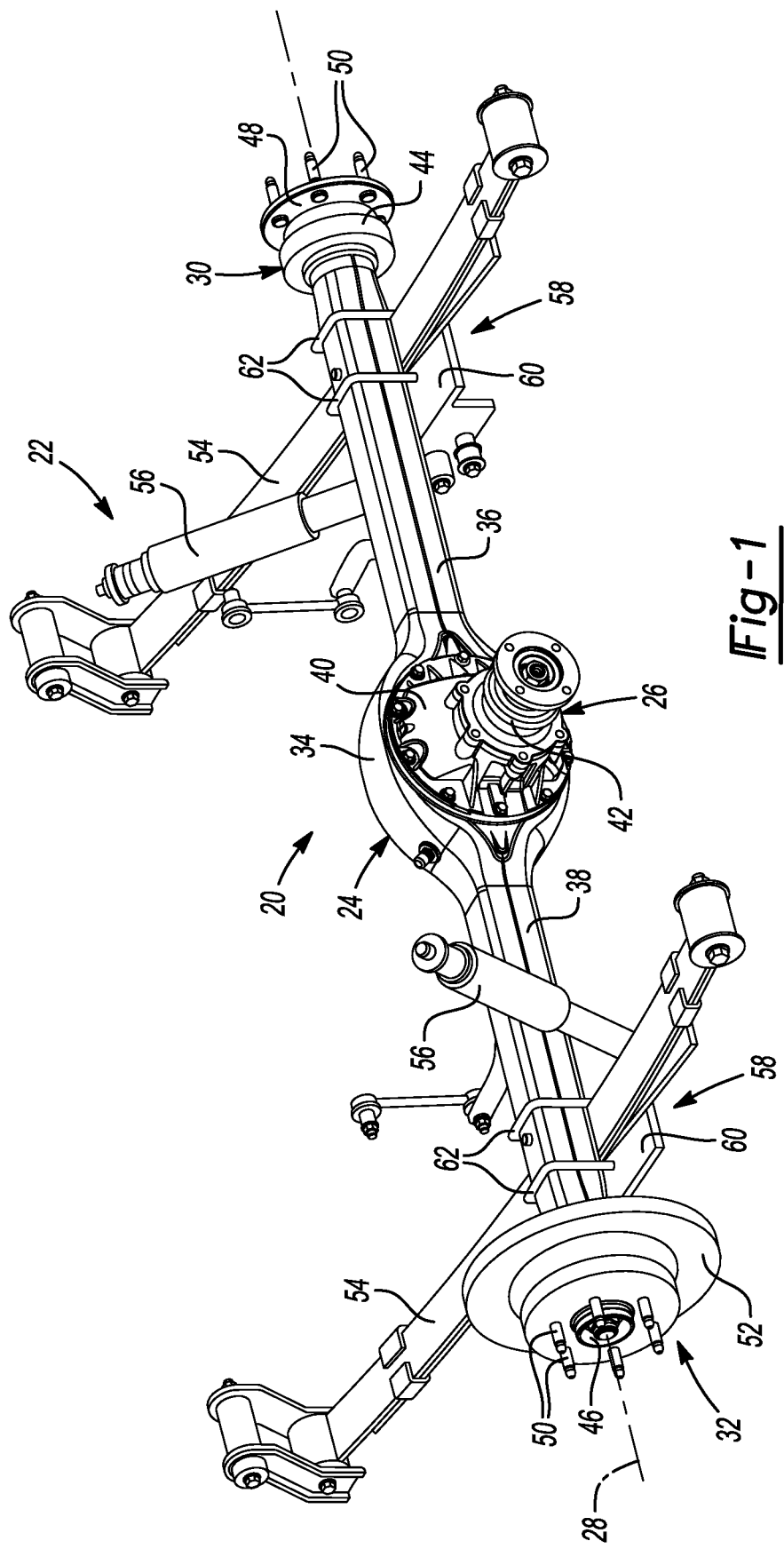
FIG. 1 is a front perspective view of an exemplary axle assembly that has been constructed in accordance with the present disclosure and that is shown in combination with an exemplary suspension system.
Figure 2:
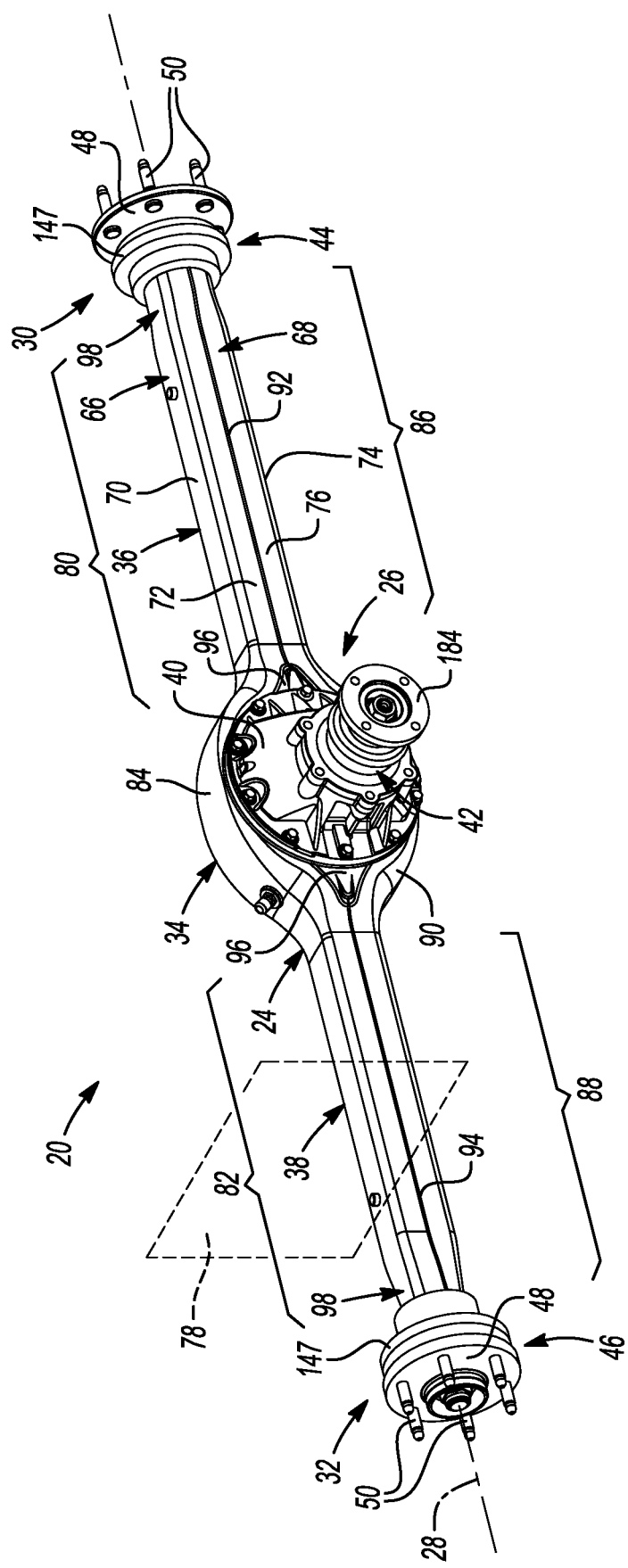
FIG. 2 is a front perspective view of the exemplary axle assembly shown in FIG. 1.
Figure 3:
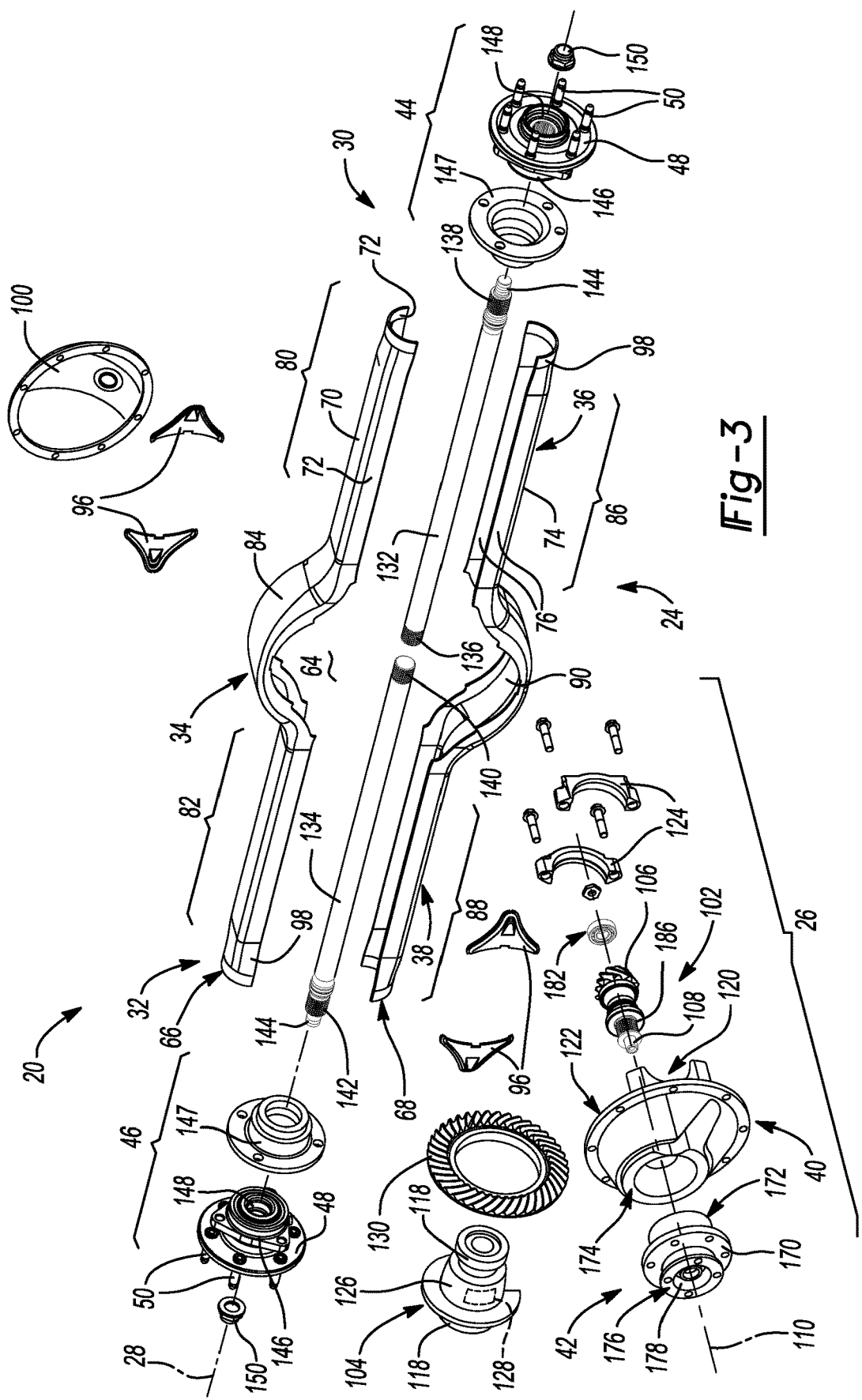
FIG. 3 is an exploded perspective view of the exemplary axle assembly shown in FIG. 1.

Referring to the Figures, wherein like numerals indicate corresponding parts throughout the several views, an axle assembly 20 for a vehicle is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates the axle assembly 20 of the present disclosure connected to an exemplary suspension system 22. The axle assembly 20 includes an axle housing 24 and a carrier assembly 26. The axle housing 24 extends longitudinally along a longitudinal axis 28 between a first wheel end 30 and a second wheel end 32. The axle housing 24 includes a center section 34, a first tubular segment 36 that extends longitudinally between the first wheel end 30 and the center section 34, and a second tubular segment 38 that extends longitudinally between the second wheel end 32 and the center section 34. The carrier assembly 26 includes a carrier housing 40 and a self-lubricating cartridge pinion input bearing 42 that is mounted to the carrier housing 40. A first self-lubricating and unitized grease wheel end bearing 44 is mounted to the first wheel end 30 of the axle housing 24 and a second self-lubricating and unitized grease wheel end bearing 46 is mounted to the second wheel end 32 of the axle housing 24. Each of the first and second self-lubricating and unitized grease wheel end bearings 44, 46 include wheel flanges 48 that are provided with circumferentially spaced wheel studs 50. A brake rotor 52 may be mounted to the wheel flanges 48 with the wheel studs 50 extending through the brake rotor 52. It should therefore be appreciated that the wheels of a vehicle (not shown) may be secured to the wheel flanges 48 of the first and second self-lubricating and unitized grease wheel end bearings 44, 46 by the wheel studs 50.

The suspension system 22 supporting the axle assembly 20 includes a pair of leaf springs 54 and a pair of dampers 56. Both the leaf springs 54 and the dampers 56 are connected to the axle assembly 20 by a pair of shackles 58. The shackles 58 include shackle plates 60 that are clamped to the first and second tubular segments 36, 38 of the axle housing 24 by U-bolts 62. The free ends of the leaf springs 54 and dampers 56 shown in FIG. 1 are configured to bolt to a body or frame of the vehicle (not shown). It should be appreciated that the axle assembly 20 illustrated in FIG. 1 could serve as either a front axle or rear axle of the vehicle.

Referring now to FIGS. 2-5, the center section 34 of the axle housing 24 is hollow, as are the first and second tubular segments 36, 38. The center section 34 and the first and second tubular segments 36, 38 of the axle housing 24 therefore cooperate to define a combined inner volume 64 of the axle housing 24. The axle housing 24 includes an upper beam 66 and a lower beam 68 that are positioned in a clam-shell arrangement. As a result, the upper and lower beams 66, 68 cooperate to form the center section 34 and the first and second tubular segments 36, 38 of the axle housing 24. The upper beam 66 of the axle housing 24 includes an upper wall 70 and a pair of upper beam side walls 72 that extend down from the upper wall 70. The lower beam 68 of the axle housing 24 includes a lower wall 74 and a pair of lower beam side walls 76 that extend up from the lower wall 74. Consequently, the upper and lower beams 66, 68 having opposing U-shaped cross-sections when viewed from the side (i.e., the cross-sections of the upper and lower beams 66, 68 are U-shaped when the cross-sections are taken along a transverse plane 78 that is perpendicular to the longitudinal axis 28).

The upper beam 66 of the axle housing 24 includes a first longitudinal section 80, a second longitudinal section 82, and an upwardly curved section 84 positioned longitudinally between the first and second longitudinal sections 80, 82. The lower beam 68 of the axle housing 24 includes a third longitudinal section 86, a fourth longitudinal section 88, and a downwardly curved section 90 that is positioned longitudinally between the third and fourth longitudinal sections 86, 88. The first longitudinal section 80 of the upper beam 66 cooperates with the third longitudinal section 86 of the lower beam 68 to form the first tubular segment 36 of the axle housing 24. The second longitudinal section 82 of the upper beam 66 cooperates with the fourth longitudinal section 88 of the lower beam 68 to form the second tubular segment 38 of the axle housing 24. The upwardly curved section 84 of the upper beam 66 and the downwardly curved section 90 of the lower beam 68 thus form the center section 34 of the axle housing 24. Although other configurations are possible, the upper and lower beams 66, 68 may be made of metal, such as iron, steel, or aluminum, and the upper beam side walls 72 may be welded to the lower beam side walls 76 at first and second seams 92, 94, which are disposed on opposing sides of the center section 34. Truss plates 96 may also be welded to the upper and lower beam side walls 70, 76 near the center section 34 for added strength and/or ease of manufacturing. Optionally, the first and second tubular segments 36, 38 of the axle housing 24 have an inward taper 98 at the first and second wheel ends 30, 32 to accommodate the first and second self-lubricating and unitized grease wheel end bearings 44, 46.

The carrier assembly 26 is housed in the center section 34 of the axle housing 24 and the carrier housing 40 is fixedly mounted to the center section 34 of the axle housing 24. A differential cover plate 100 is also fixedly mounted to the center section 34 of the axle housing 24, opposite the carrier housing 40. Although other configurations are possible, both the carrier housing 40 and the differential cover plate 100 may be made of metal, such as iron, steel, or aluminum, and may be bolted or welded to the axle housing 24. The carrier assembly 26 also includes a pinion 102 and a differential assembly 104.

The pinion 102 includes a pinion gear 106 and a pinion shaft 108 that extends through the carrier housing 40 along a pinion shaft axis 110. The pinion shaft axis 110 extends perpendicularly relative to the longitudinal axis 28 of the axle housing 24 and is spaced from the longitudinal axis 28 by a hypoid offset distance 112 (see FIG. 5). By way of example only and without limitation, the hypoid offset distance 112 may be small, such as 1 to 20 millimeters (mm) and preferably 10 millimeters (mm). This small hypoid offset reduces friction (e.g., scuffing losses) in the pinion gear mesh by approximately 3 percent compared to larger hypoid offset distances in the 35-45 millimeter (mm) range.

If the hypoid offset is reduced to zero, the axes would intersect and the gear arrangement would no longer be considered a hypoid gearset but be labeled as a spiral bevel gearset. For many applications, it is important that at least some hypoid offset is provided to allow the gearset to transmit a higher torque than a similarly sized spiral bevel gearset. The hypoid arrangement also introduces some relative sliding motion across the contact pattern between the pinion gear and the ring gear which produces a quiet gearset during operation. The embodiment of the present disclosure provides an optimized final drive gearset by simultaneously minimizing the hypoid offset to increase mechanical efficiency of the gearset while maintaining a desired amount of hypoid offset to increase torque transfer capacity and reduce noise.

It should be appreciated that the hypoid offset reduction is made possible by changing the loading configuration of the pinion shaft from the typical cantilevered arrangement where both pinion shaft bearings are on one side of the pinion gear to a straddled design where the cartridge bearing is on one side of the pinion gear and a spigot bearing is on the opposite side of the pinion gear. The straddled bearing design substantially minimizes the angular deflection imparted on the pinion shaft during torque transmission. The straddled design is described in greater detail below in relation to a spigot bearing.

Pinion shaft 108 may be configured to include an inboard, or first pinion shaft segment 114 and an outboard, or second pinion shaft segment 116. The pinion gear 106 is positioned axially between the inboard pinion shaft segment 114 and the outboard pinion shaft segment 116 such that the inboard pinion shaft segment 114 protrudes inwardly from the pinion gear 106 and the outboard pinion shaft segment 116 protrudes outwardly from the pinion gear 106 along the pinion shaft axis 110. Pinion shaft 108 includes an externally splined portion 117.

Figure 4:
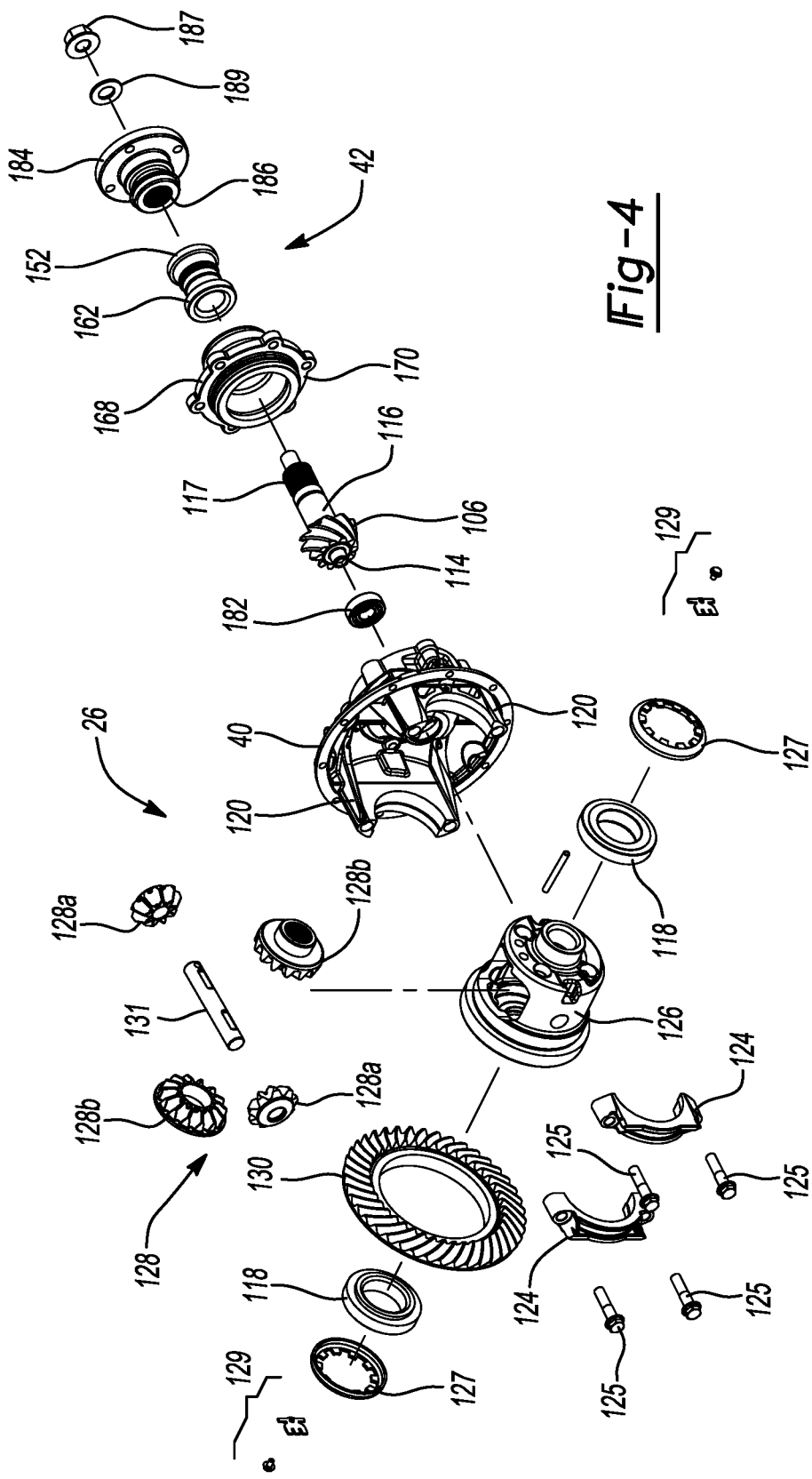
FIG. 4 is an exploded perspective view of a carrier assembly of the exemplary axle assembly shown in FIG. 1.

As shown in FIG. 4, differential assembly 104 is rotatably supported on the carrier housing 40 by a pair of differential bearings 118. As a result, the differential assembly 104 is rotatable relative to the carrier housing 40 about the longitudinal axis 28. The differential bearings 118 are held between a pair of mounting bosses 120 that extend from an inboard side 122 of the carrier housing 40 and a pair of caps 124 that extend partially about the differential bearings 118. Although other configurations are possible, the caps 124 may be bolted to the mounting bosses 120 of the carrier housing 40 via threaded fasteners 125. Bearing adjustment nuts 127 are rotatable to vary the preload on differential bearings 118. Retainers 129 restrict the adjustment nuts 127 from rotation after the differential bearing preload has been set.

Differential assembly 104 includes a differential housing or differential body 126 and a planetary gearset 128. Planetary gear set 128 includes pinion gears 128a drivingly engaged with side gears 128b. Pinions gears 128a are supported for rotation on a cross-shaft 131. Alternate arrangement differential gear sets, such as parallel axis gears, are contemplated as the gearset shown is merely exemplary.

A ring gear 130 is fixed to the differential housing 126 and arranged in meshing engagement with the pinion gear 106. The ring gear 130 rotates co-axially about the longitudinal axis 28 of the axle housing 24. By way of example and without limitation, the ring gear 130 may be fixed to the differential body 126 by laser welding instead of by a flanged and bolted connection, which can help reduce weight, eliminate fastener costs, eliminate bolts as a potential failure mode, and reduce churning losses. It should be appreciated that the differential assembly 104 may be any one of the various types of differentials known in the industry, including without limitation, open differentials, limited slip differentials, electronic differentials, and locking differentials.

The axle assembly 20 also includes first and second axle shafts 132, 134 that extend out along the longitudinal axis 28 from opposing sides of the differential assembly 104. The first axle shaft 132 extends longitudinally through the first tubular segment 36 of the axle housing 24 between a first axle shaft inboard end 136 and a first axle shaft outboard end 138. The second axle shaft 134 extends longitudinally through the second tubular segment 38 of the axle housing 24 between a second axle shaft inboard end 140 and a second axle shaft outboard end 142. The first and second axle shaft inboard ends 136, 140 and the first and second axle shaft outboard ends 138, 142 are splined. The first and second axle shaft outboard ends 138, 142 may also include threaded portions 144. The first and second axle inboard ends 136, 140 are received in the differential assembly 104 and are rotationally coupled to the pinion gear 106 through the planetary gearset 128.

The axle assembly 20 of the present disclosure uniquely includes a self-lubricating bearing arrangement that includes the combination of a self-lubricating cartridge pinion input bearing 42 with first and second self-lubricating and unitized grease wheel end bearings 44, 46. In accordance with this arrangement, the outboard pinion shaft segment 116 is rotatably supported by the self-lubricating cartridge pinion input bearing 42, which is mounted to the carrier housing 40 and allows the pinion 102 to rotate relative to the carrier housing 40 about the pinion shaft axis 110. The first axle shaft outboard end 138 is rotatably supported by the first self-lubricating and unitized grease wheel end bearing 44, which is mounted to the first wheel end 30 of the axle housing 24. The second axle shaft outboard end 142 is rotatably supported by a second self-lubricating and unitized grease wheel end bearing 46, which is mounted to the second wheel end 32 of the axle housing 24. As a result, the first and second axle shafts 132, 134 can rotate within the axle housing 24 about the longitudinal axis 28.

As explained above, wheel flanges 48 of the first and second self-lubricating and unitized grease wheel end bearings 44, 46 have circumferentially spaced wheel studs 50. Wheel flanges 48 are connected to and rotate with an inner race 146 of the first and second self-lubricating and unitized grease wheel end bearings 44, 46. The inner races 146 include splined bores 148 that receive the first and second axle shaft outboard ends 138, 142 such that the splines on these respective components rotatably couple the inner races 146 and thus the wheel flanges 48 to the first and second axle shafts 132, 134. Because the splines on the first and second axle shaft inboard ends 136, 140 mate with the differential assembly 104, which is rotatably driven by the ring gear/pinion gear mesh, the rotational power and torque of the engine can be transmitted to the wheels of the vehicle. The first and second self-lubricating and unitized grease wheel end bearings 44, 46, also include outer races 147 that extend annularly about the inner races 146. The outer races 147 are fixedly mounted to the first and second wheel ends 30, 32 of the axle housing 24, such as by welding or a bolted connection. Greased bearings (not shown) may be provided between the inner and outer races 146, 147 to reduce friction. These greased bearings could be tapered roller bearings, high contact ball bearings, or a combination of tapered roller bearings and high contact ball bearings depending on the desired load rating. Wheel end nuts 150 thread onto the threaded portions 144 of the first and second axle shaft outboard ends 138, 142 to prevent free play along the longitudinal axis 28 between the wheel flanges 48 and the first and second axle shafts 132, 134.

In accordance with this design, the first and second axle shafts 132, 134 are provided in a full floating arrangement, where both the first and second axle shaft inboard ends 136, 140 and both the first and second axle shaft outboard ends 138, 142 have splined connections and are supported by bearings 44, 46, 118. This full floating arrangement provides better support for the first and second axle shafts 132, 134, which reduces binding and distributes loading between multiple bearings 44, 46, 118 for improvements in mechanical efficiency and durability.

Figure 5:
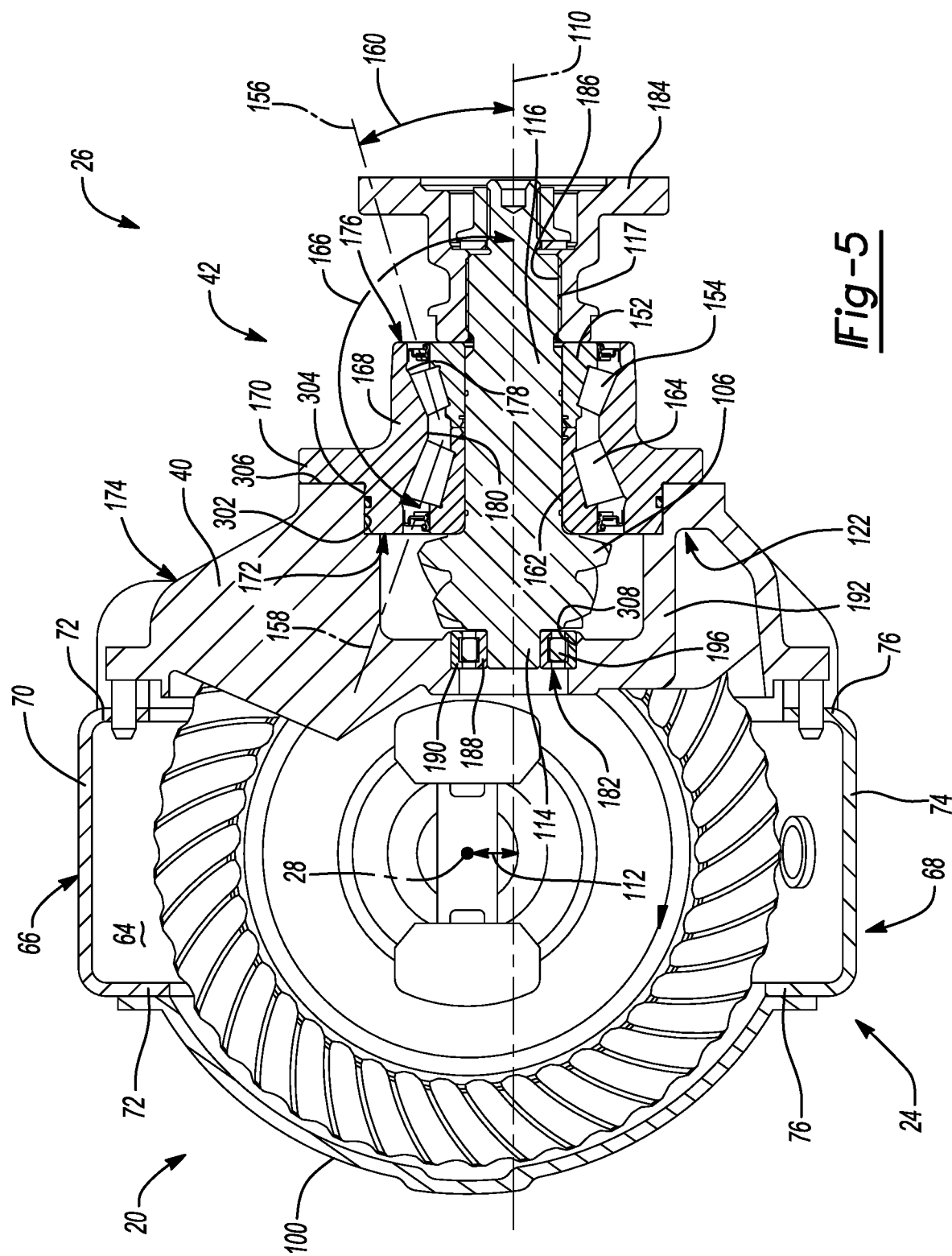
FIG. 5 is a side section view of the exemplary axle assembly.

As best seen in FIGS. 4 and 5, the self-lubricating cartridge pinion input bearing 42 includes a first cone 152 that extends annularly about the outboard pinion shaft segment 116. The first cone 152 supports a first set of cylindrical roller bearings 154 at a number of circumferentially spaced positions. Each cylindrical roller bearing 154 in the first set of cylindrical roller bearings 154 rotates about its own roller bearing axis 156 that is arranged at a first angle 160 relative to the pinion shaft axis 110 and can rotate relative to the first cone 152 and the pinion shaft 108. The first angle 160 is an acute angle (i.e., greater than zero degrees, but less than 90 degrees relative to the pinion shaft axis 110) with an arc that opens away from the pinion gear 106. The self-lubricating cartridge pinion input bearing 42 also includes a second cone 162 that extends annularly about the outboard pinion shaft segment 116 at a location that is positioned axially between the first cone 152 and the pinion gear 106. The second cone 162 supports a second set of cylindrical roller bearings 164 at a number of circumferentially spaced positions. Each cylindrical roller bearing 164 in the second set of cylindrical roller bearings 164 rotates about its own roller bearing axis 158 that is arranged at a second angle 166 relative to the pinion shaft axis 110 and can rotate relative to the second cone 162 and the pinion shaft 108. The second angle 166 is an obtuse angle (i.e., greater than 90 degrees, but less than 180 degrees relative to the pinion shaft axis 110) with an arc that opens away from the pinion gear 106. In the illustrated embodiment, the first and second angles 160, 166 are supplementary angles, meaning that the sum of the first and second angles 160, 166 equals 180 degrees.

The self-lubricating cartridge pinion input bearing 42 includes a one-piece cup 168 that extends annularly about the cylindrical roller bearings 154, 164. The one-piece cup 168 includes a cup flange 170 that is fixedly coupled to the carrier housing 40, such as through a bolted connection. The one-piece cup 168 extends axially between an inboard edge 172 that abuts an outside face 174 of the carrier housing 40 and an outboard edge 176 opposite the inboard edge 172 that faces away from the carrier housing 40. The one-piece cup 168 also includes a tapered bore 178 that increases in diameter moving in opposing directions from an intermediate portion 180 of the one-piece cup 168 to the inboard and outboard edges 172, 176. In this way, the tapered bore 178 matches the mounting orientation of the cylindrical bearings 154, 164, where the first and second angles 160, 166 that the cylindrical bearings 154, 164 are supported at slope inwardly towards the intermediate portion 180 of the one-piece cup 168. Alternatively, the cylindrical roller bearings 154, 164 could be replaced by tapered roller bearings, high contact ball bearings, or a combination of tapered roller bearings and high contact ball bearings depending on the desired load rating.

It should also be appreciated that self-lubricating cartridge pinion input bearing 42 could be configured as a sealed grease bearing or a sealed oil bath bearing. In configurations where the self-lubricating cartridge pinion input bearing 42 is a sealed oil bath bearing, it could be provided with a remote sump, forced lubrication, and passive or active cooling. As such, the self-lubricating cartridge pinion input bearing 42 could be lubricated with grease, gear lube, or ATF (automatic transmission fluid).

A coupler 184 may be fixed for rotation with the outboard pinion shaft segment 116 by an internal spline 186 and the coupler 184 may be bolted or otherwise connected to a drive shaft (not shown) that is rotationally driven by a motor (not shown), through a transmission (not shown). A nut 187 is threadingly engaged with outboard pinion shaft segment 116. During an assembly and pinion input bearing preload process, nut 187 is rotated to axially translate a washer 189 to drive coupler 184 into contact with first cone 152. Desirable column loading may exist along first cone 152 and second cone 162. Beneficially, a pinion bearing preload may be preset within a sub-assembly of pinion 102, self-lubricating cartridge pinion input bearing 42, coupler 184 and nut 187 prior to coupling the pinion 102 to the carrier housing 40.

In typical drive axle assembly manufacturing facilities, one or more work stations are dedicated to setting pinion bearing preload. One well known procedure includes implementing a trial and error process where an initial quantity of shims are placed between a pinion bearing mounting flange and the carrier housing. A threaded fastener is driven to clamp the pinion bearing flange to the carrier which at the same time sets the pinion bearing preload. The magnitude of the pinion bearing preload is based on the thickness of the shim pack. If the first guess at shim thickness is incorrect, the assembler disassembles the pinion shaft, pinion gear, pinon flange arrangement and repeats the process using a different shim pack thickness. This iterative process continues until the pinion bearing preload is within a predetermined range. The self-lubricating cartridge pinion input bearing and pinion shaft design of the present disclosure eliminates this very time intensive work station from the axle assembly plant.

Another beneficial feature of the present disclosure relates to the inboard pinion shaft segment 114 being rotatably supported by a spigot bearing 182. The spigot bearing 182 includes an inside race 188 that extends annularly about the inboard pinion shaft segment 114, an outside race 190 that is supported by a spigot support boss 192 that protrudes axially from the inside face of the carrier housing 40 and extends annularly about the outside race 190 of the spigot bearing 182. A plurality of ball bearings 196 are positioned radially between the inside and outside races 188, 190 of the spigot bearing 182. As a result, the pinion shaft 108 can rotate relative to the carrier housing 40 about the pinion shaft axis 110. The spigot bearing 182 helps support gear separation forces resulting from the pinion gear/ring gear mesh and therefore reduces the amount of deflection experienced by the pinion shaft 108. This allows the first and second cones 152, 162 to be placed closer to each other resulting in a more compact size for the self-lubricating cartridge pinion input bearing 42, resulting in less weight. For example, the first and second cones 152, 162 can be placed next to each other in an abutting arrangement.

Figure 6:
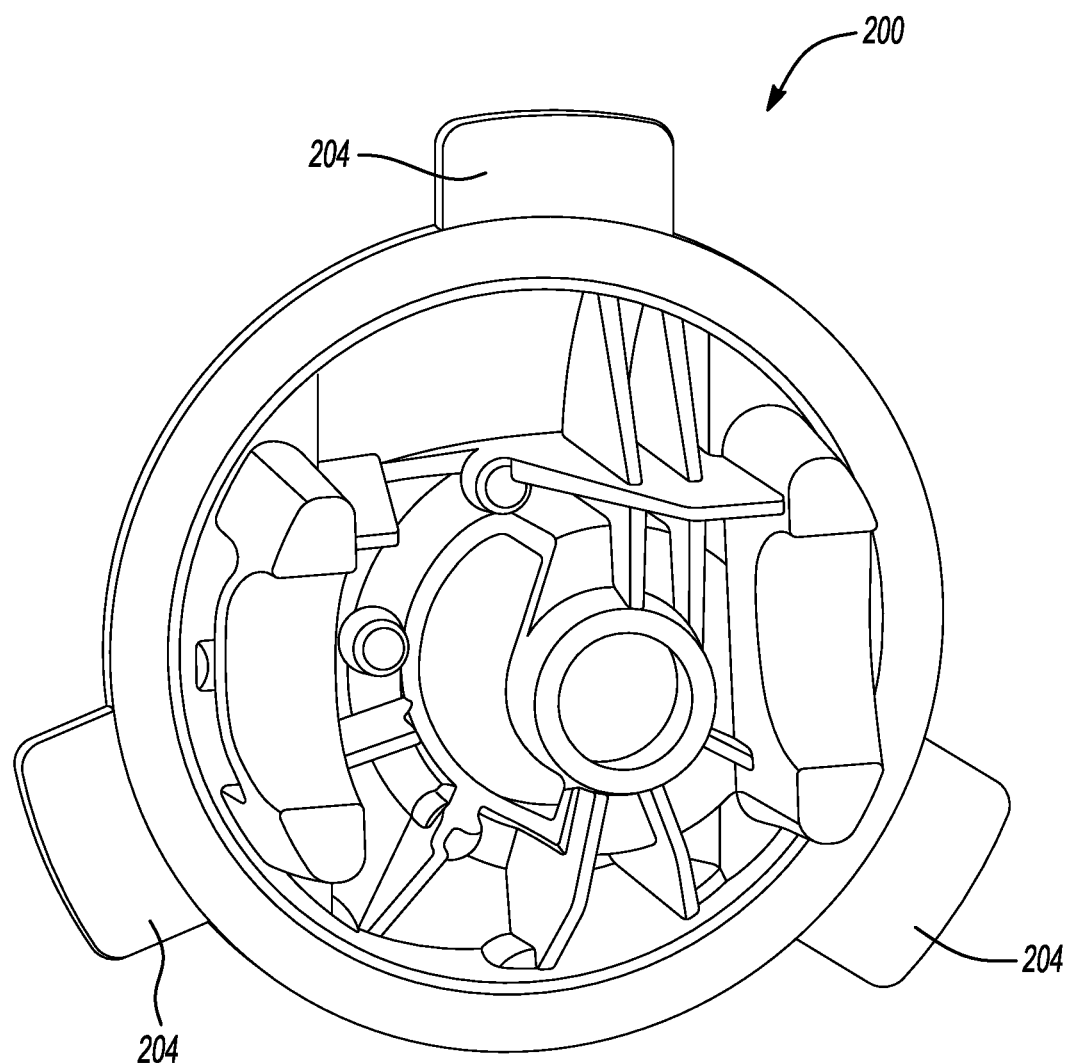
FIG. 6 is a perspective view of a carrier housing in a pre-machined, as-cast condition.

It may be beneficial to implement a particular manufacturing process to assure proper positioning of carrier assembly 26 axle housing 24 as well as the relative position of components within carrier housing 40. FIG. 6 depicts a carrier housing 200 that has yet to be machined to define carrier housing 40. Carrier housing may be formed via casting, forging, molding or other suitable process. Carrier housing 200 includes three circumferential spaced apart tabs 204. Each of the features depicted in FIG. 6 integrally formed with one another during the casting, forging or molding process. Carrier housing 200 may be formed from cast aluminum material some other suitable metal alloy.

Figure 7:
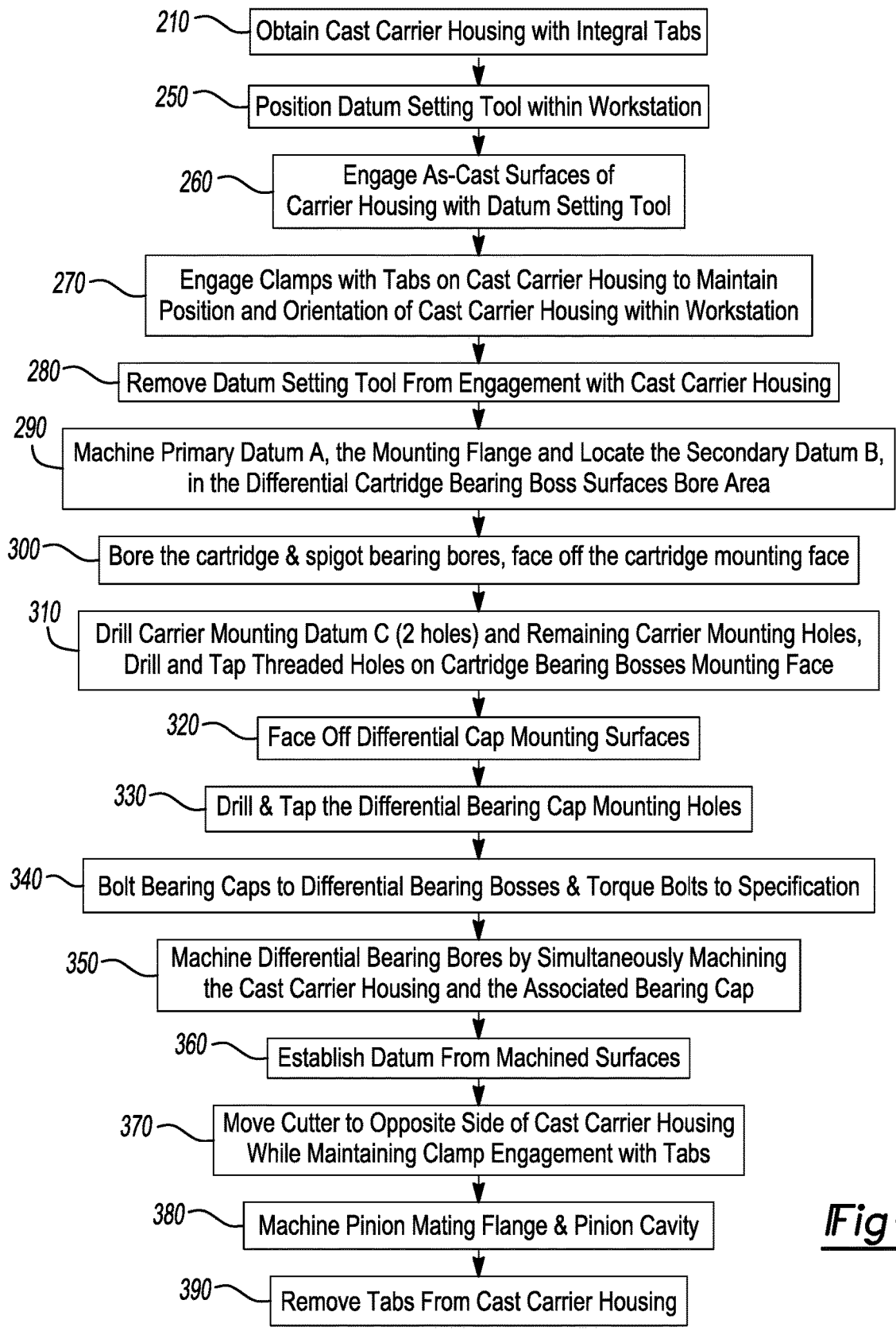
FIG. 7 is a flow chart describing a method of machining the carrier housing.
Figure 8:
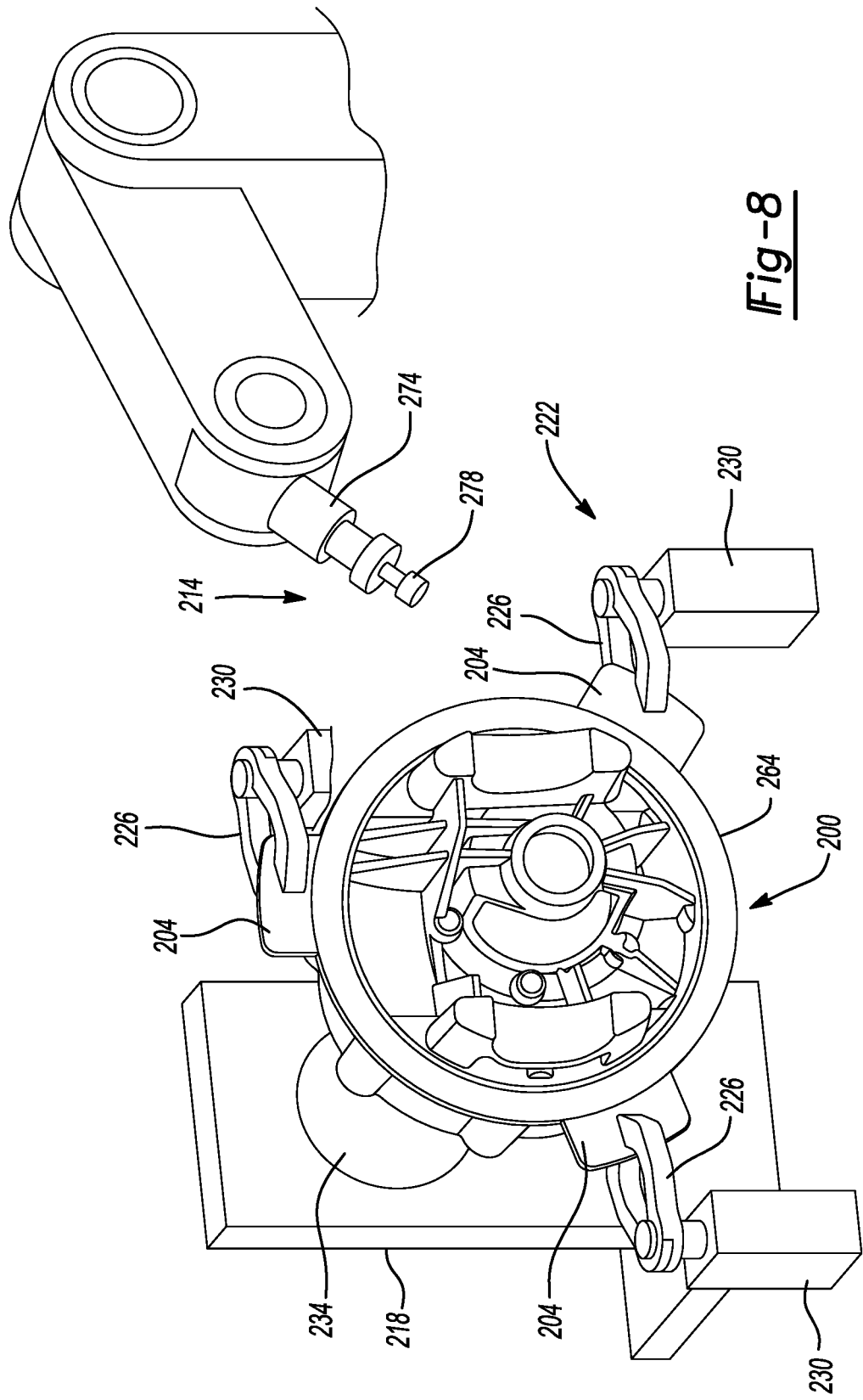
FIG. 8 is a perspective vie of a work cell for performing the method of machining the carrier housing.

FIG. 7 provides a flow chart listing manufacturing steps performed to accurately form carrier housing 40. At block 210 carrier housing 200 and obtained. An operator, either human or mechanical, transfers carrier housing 200 to a work cell 214, shown in FIG. 8. Work cell 214 includes a datum setting fixture 218 that is movable between a first position depicted in and a second position spaced apart from the first position. Work cell 214 further includes clamping tooling 222 including a plurality of circumferentially spaced apart clamps 226. Clamps 226 are operable to apply a clamping force to tabs 204 or be releasably spaced apart therefrom. Clamping tooling 222 may include individual stanchions or supports 230 individually supporting clamps 226 or may include an alternate arrangement, not shown, where each clamp 226 is coupled to a common structure such as a skeleton. It is envisioned that clamps 226 are very rigidly and robustly fixed to ground such that the position of carrier housing 200 remains accurately stationary once clamps 226 secure carrier housing 200.

Figure 9:
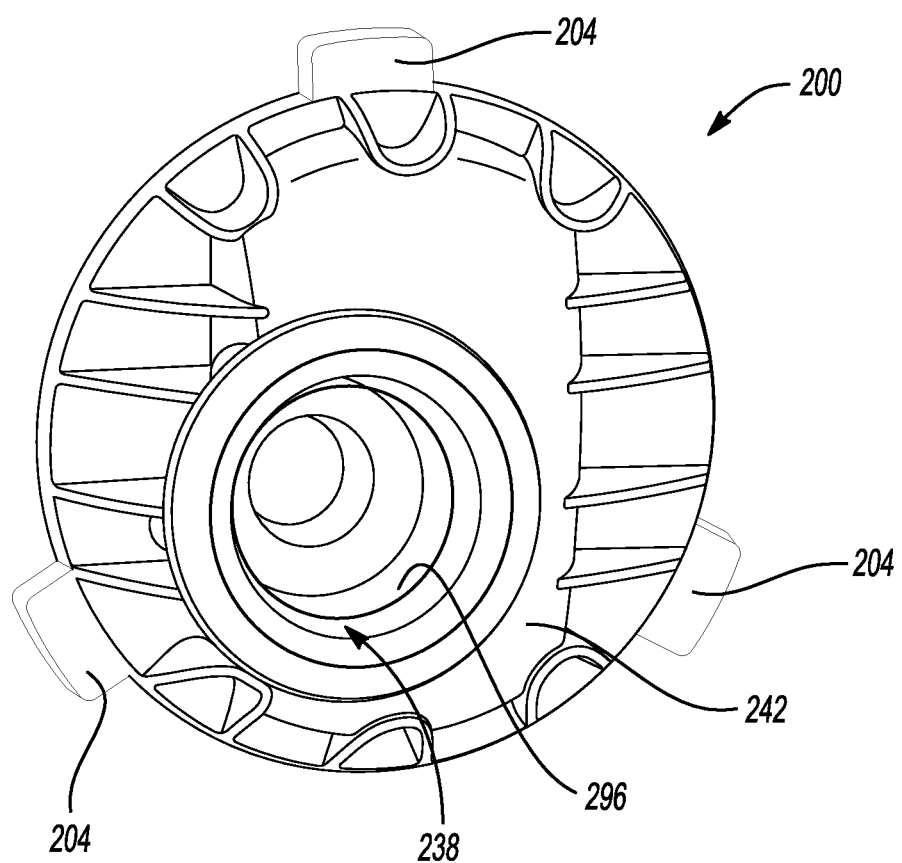
FIG. 9 is another perspective view of the carrier housing in a pre-machined condition.

Datum setting fixture 218 includes a set of surfaces 234 that are sized and arranged to engage one or more geometrical features 238, as depicted in FIG. 9, on an outer surface 242 of carrier housing 200. At block 250, datum setting fixture 218 is moved to the first position within work cell 214. Carrier housing 200 is moved into engagement with surfaces 234 of datum setting fixture 218 at block 260. An alternative datum setting procedure may be used via a coordinate measuring machine (CMM) that is incorporated into work cell 214. The CMM is programmed to probe the surface of carrier housing 200 at particular zones where future datums will be machined. An algorithm within the CMM mathematically orients the cast version of carrier housing 200 to assure that adequate material exists to machine the various surfaces described later to define a finished carrier housing 40. A flange 264 of carrier housing 200 is oriented vertically relative to ground either by one of the surfaces 234, an additional gauge surface (not shown), or via the CMM. Once the carrier housing 200 is positioned within work cell 214 at the desired position and orientation, clamps 226 are actuated to apply clamping forces to tabs 204 at block 270. At this time, carrier housing 200 is fixed in three-dimensional space relative to datum setting fixture 218 as well as relative to a coordinate system of work cell 214.

Work cell 214 further includes a five-axis machining head 274 selectively equipped with one or more cutting tools 278 to remove portions of carrier housing 200 and define qualified machined surfaces. The machined surfaces may be planar, cylindrical or exhibit a complex shape since the five-axis machining head is movable along typical x, y, and z Cartesian coordinates as well as rotatable about two separate axes. Once carrier housing is clamped, datum setting fixture 218 is moved at block 280 to its second position to clear a path for five-axis machining head 274.

Figure 10A:
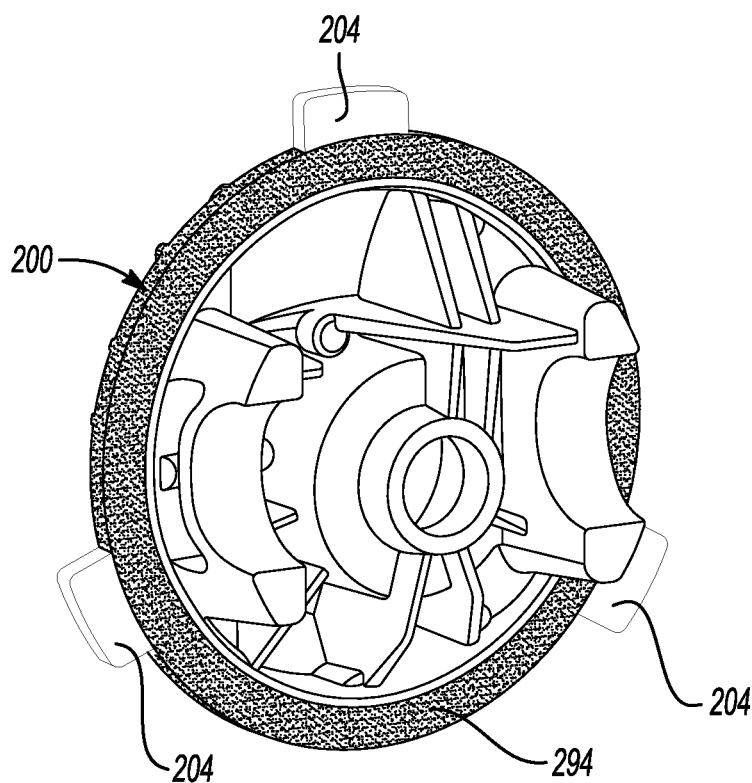
FIGS. 10A-10G depicted various stages of progress through the method of machining the carrier housing.

At block 290, five-axis machining head 274 is controlled to rotate cutting tool 278 and engage the cutting tool with cast surfaces of carrier housing. In particular, a planar mounting flange 294 is machined as shown in FIG. 10A to define Datum A. The process continues by locating a secondary Datum B in a differential cartridge bearing bore area generally identified by reference numeral 296 in FIG. 9. It should appreciated that other cast areas could also be selected. The particular area indicated corresponds to the center point of the casting where bearings will engage the carrier housing. This procedure will ensure that sufficient material exists for machining the finished surfaces.

Figure 10B:
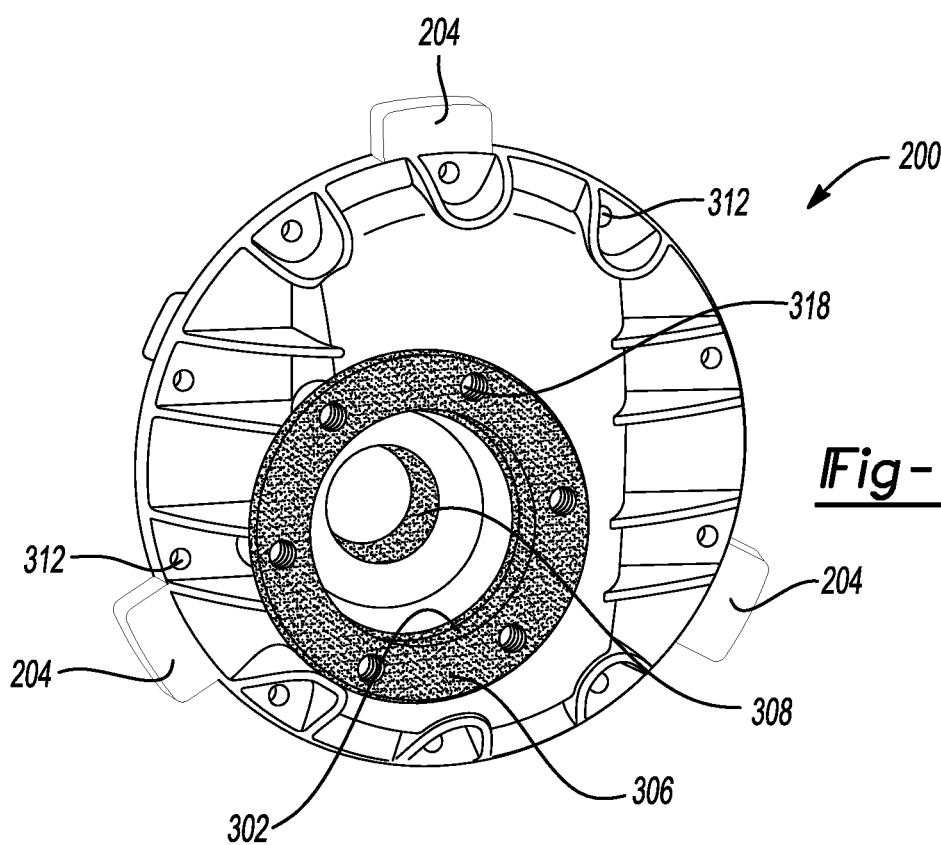

Control continues at block 300 to instruct five-axis head 274 to machine the features depicted in FIG. 10B. A cartridge bore 302 is formed for later receipt of a pilot portion 304 of one-piece cup 168 (FIG. 5). An adjacent portion of carrier housing 200 is faced to define a cartridge mounting flange 306. Flange 170 of cartridge pinion input bearing 42 engages cartridge mounting flange 306 during component assembly operations after the machining method has been completed. A cylindrical spigot bearing bore 308 is machined for later receipt of outside race 190 of spigot bearing 182.

Additional features are added during control block 310. A plurality of circumferentially spaced apart carrier mounting holes 312 are bored through planar mounting flange 294. More particularly, a third datum, Datum C, is provided by first drilling two of the plurality of carrier mounting holes 312. The process continues by drilling the remaining carrier mounting holes 312. Threaded holes 318 are drilled and tapped through cartridge mounting flange 306 as shown in FIG. 10B.

Figure 10C:
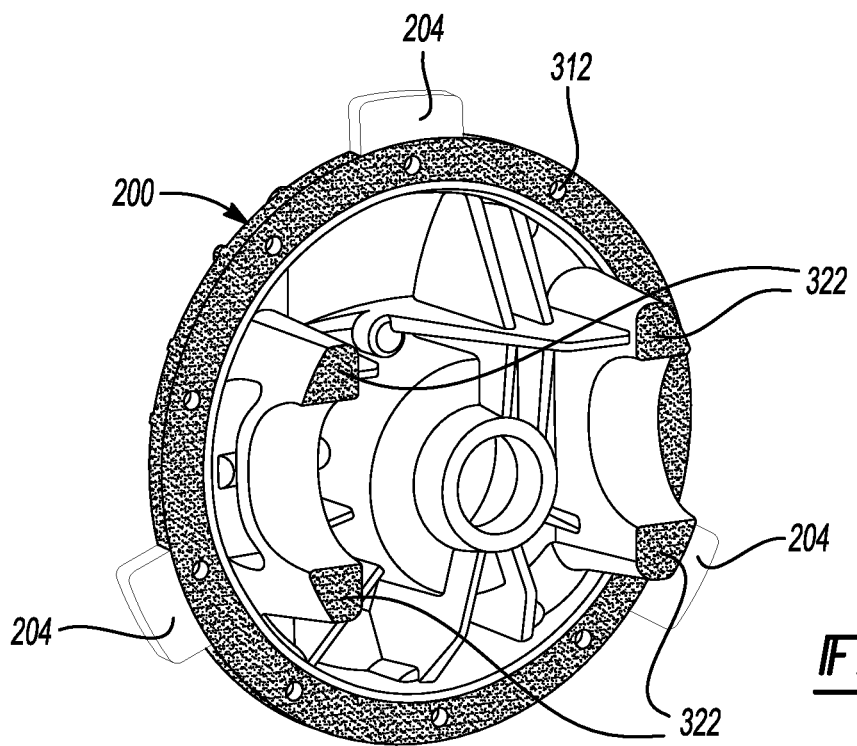
Figure 10D:
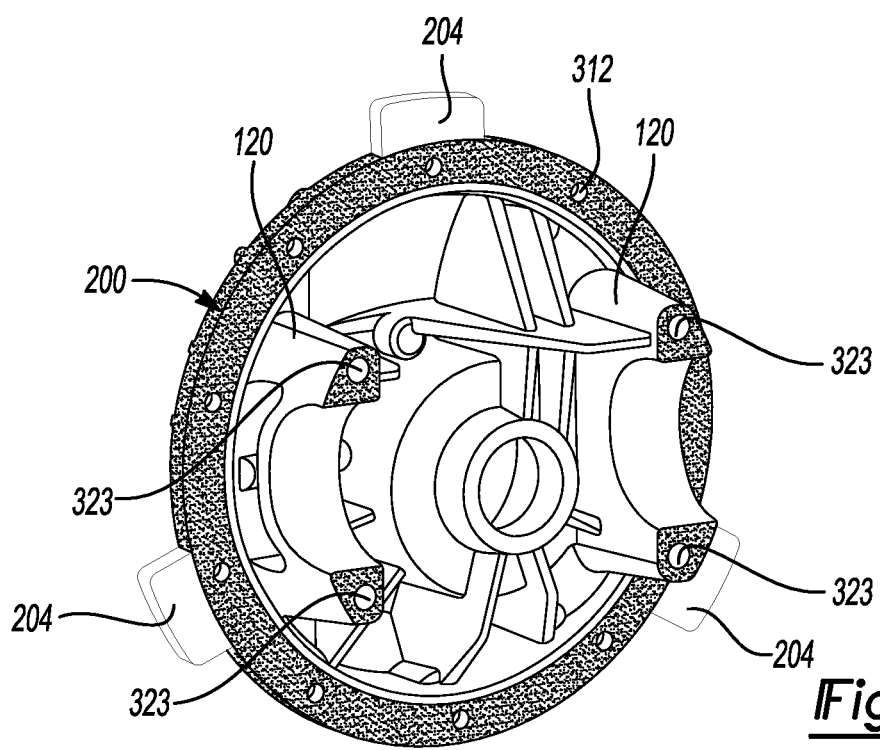

Control of five-axis machining head 274 continues at block 320. Four differential bearing boss surfaces 322 are defined by cutting tool 278 as shown in FIG. 10C. A plurality of internally threaded bores 323 are machined within mounting bosses 120 at block 330, as depicted in FIG. 10D.

Figure 10E:
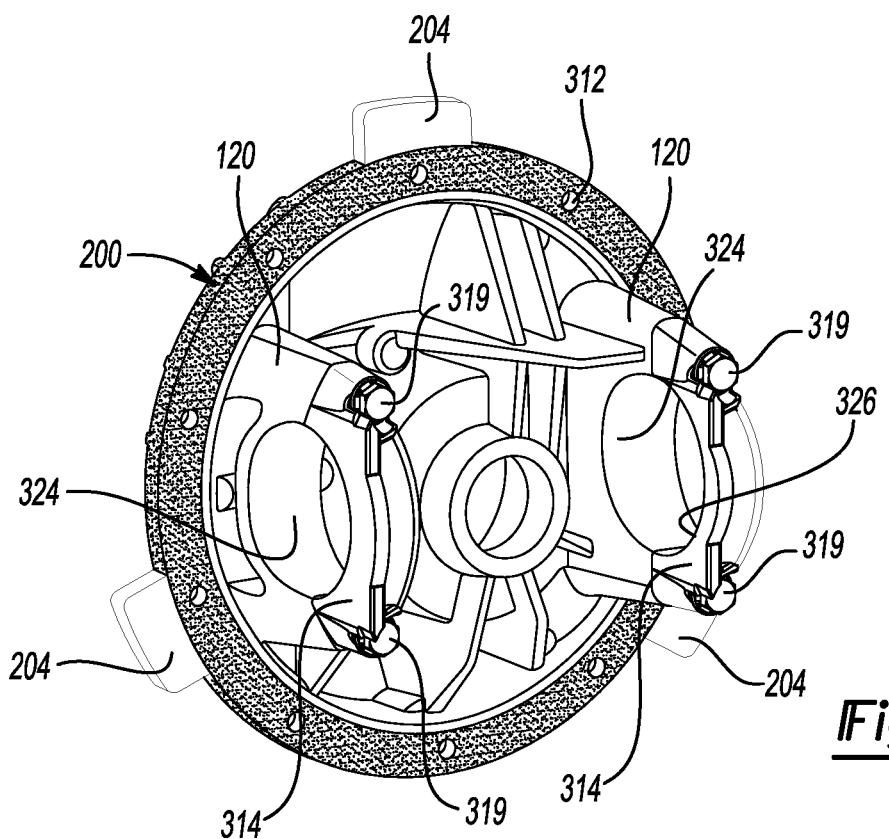
Figure 10F:
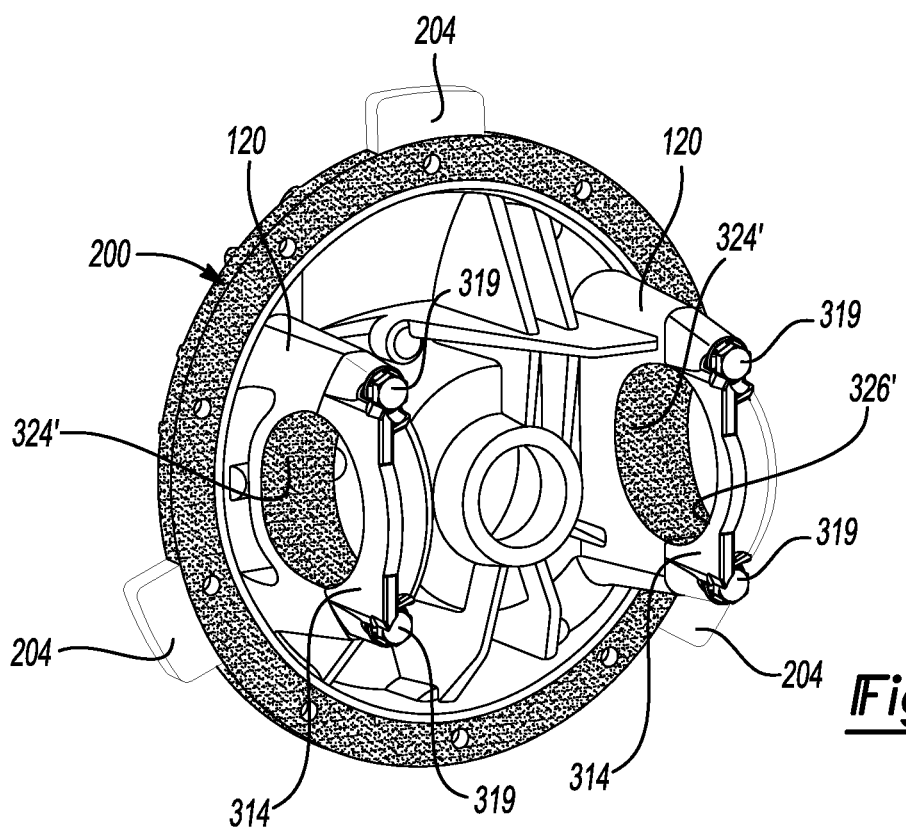
Figure 10G:
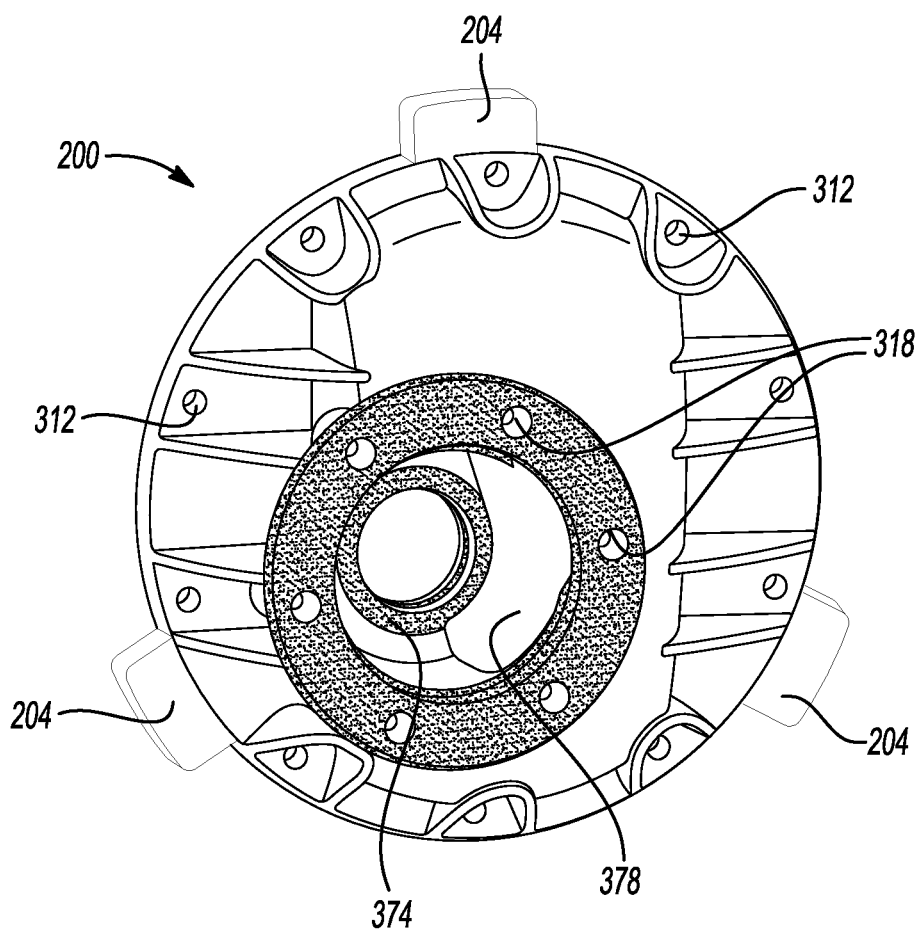

FIG. 10E shows partially finished bearing caps 314 fixed to mounting bosses 120 via threaded fasteners 319. Fasteners 319 are torqued to specification. This sub-assembly step is completed at block 340. It should be appreciated that rough cast semi-cylindrical surfaces 324 on mounting bosses 120 are placed adjacent to rough cast semi-cylindrical surfaces 326 to form a rough bearing opening. At block 350, differential bearing bores are machined by simultaneously cutting one of surfaces 324 with the corresponding surface 326 to define finished surfaces 324' and 326' as shown in FIG. 10F. The cylindricity of each differential bearing bore is accurately maintained by attaching partially finished bearing caps 314 to carrier housing 200 prior to finish machining of the differential bearing bores.

At this point of manufacturing, it may be beneficial to utilize the datums established by the recently machined surfaces. As previously discussed, Datum A is provided by machined mounting flange 294, Datum B is differential cartridge bearing bore 296, and Datum C includes two of carrier mounting holes 314. At block 370, five-axis machining head 274 is moved to the opposite side of carrier housing 200. Cutting tool 278 is driven to machine a pinion mating flange 374 and a pinion cavity 378, on the opposite side of carrier housing 200 as the previously described features, at block 380. It should be appreciated that each and every step performed at blocks 270-380 occurs while clamps 226 continue engagement with tabs 204 to maintain the orientation of carrier housing 200.

At block 390, clamps 226 are disengaged from tabs 204. Carrier housing 200 is either removed from work cell 214 or re-clamped at a different set of locations such that tabs 204 may be removed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A method of machining a carrier housing for an axle assembly, comprising;
    obtaining a carrier housing including circumferentially spaced apart tabs;
    positioning a datum setting tool in engagement with the carrier housing;
    clamping the carrier housing to a fixture to position the carrier housing at a first orientation relative to a coordinate system within a work cell;
    removing the datum setting tool from engagement with the carrier housing;
    machining portions of the carrier housing along a first side of the carrier housing to define geometrical features including a planar carrier mounting flange and a first cylindrical bearing bore having a longitudinal axis extending perpendicular to the planar carrier mounting flange while the carrier housing remains clamped at the first orientation; and
    machining a different portion of the carrier housing on a second opposite side of the carrier housing to define another geometrical feature.

2. The method of machining a carrier housing as set forth in claim 1, wherein the carrier housing is oriented such that the carrier mounting flange extends vertically relative to ground.

3. The method of machining a carrier housing as set forth in claim 1, further comprising establishing datums from the geometrical features defined by machining on the first side of the carrier housing and subsequently machining the another geometrical feature based on the datums.

4. The method of machining a carrier housing as set forth in claim 1, further comprising unclamping the carrier housing from the fixture after the geometrical features have been defined by machining on the first side of the carrier housing and subsequently removing the tabs.

5. The method of machining a carrier housing as set forth in claim 1, wherein machining portions of the carrier housing includes drivingly coupling a cutting tool to a head and controlling movement of the cutting tool based on translation along three orthogonal axes and rotation about two axes.

6. The method of machining a carrier housing as set forth in claim 1, wherein obtaining the carrier housing includes casting the carrier housing to integrally include the tabs.

7. The method of machining a carrier housing as set forth in claim 1, further comprising facing off differential bearing cap surfaces while the carrier housing remains clamped at the first orientation.

8. The method of machining a carrier housing as set forth in claim 7, further comprising fixing differential bearing caps to the differential bearing cap surfaces and subsequently machining differential bearing bores by removing material from the carrier housing and the differential bearing caps while the carrier housing remains clamped at the first orientation.

9. A method of machining a carrier housing for an axle assembly, comprising;
    obtaining a carrier housing including integrally formed and circumferentially spaced apart tabs;
    positioning a datum setting tool at a first position within a work cell;
    engaging a portion of the carrier housing with the datum setting tool;
    aligning the carrier housing relative to the work cell;
    clamping the carrier housing to a fixture within the work cell to position the carrier housing at a first orientation relative to a coordinate system;
    moving the datum setting tool from the first position to a second spaced apart position to disengage datum setting tool from the carrier housing;
    machining portions of the carrier housing positioned on a first side of the carrier housing to define geometrical features including a planar carrier mounting flange, a first cylindrical bearing bore having a longitudinal axis, and second bearing bore having a second longitudinal axis extending perpendicular to the first longitudinal axis while the carrier housing remains clamped at the first orientation; and
    subsequently machining a different portion of the carrier housing on a second opposite side of the carrier housing to define another geometrical feature while the carrier housing remains clamped at the first orientation.

10. The method of machining a carrier housing as set forth in claim 9, wherein aligning the carrier housing includes orienting the carrier mounting flange vertically relative to ground.

11. The method of machining a carrier housing as set forth in claim 9, further comprising establishing datums from the geometrical features defined by machining on the first side of the carrier housing and subsequently machining the another geometrical feature based on the datums.

12. The method of machining a carrier housing as set forth in claim 9, further comprising unclamping the carrier housing from the fixture after the geometrical features have been defined by machining on the first side of the carrier housing and subsequently removing the tabs.

13. The method of machining a carrier housing as set forth in claim 9, wherein obtaining a carrier housing includes integrally casting the carrier housing with the tabs.

14. The method of machining a carrier housing as set forth in claim 9, further comprising facing off differential bearing cap surfaces while the carrier housing remains clamped at the first orientation.

15. The method of machining a carrier housing as set forth in claim 14, further comprising fixing differential bearing caps to the differential bearing cap surfaces and subsequently machining differential bearing bores by removing material from the carrier housing and the differential bearing caps while the carrier housing remains clamped at the first orientation.

* * * * *